US008834624B2

(12) United States Patent
Soltanian et al.

(10) Patent No.: US 8,834,624 B2
(45) Date of Patent: Sep. 16, 2014

(54) MODIFIED CEMENT COMPOSITION, PREPARATION AND APPLICATION THEREOF

(75) Inventors: Hamid Soltanian, Tehran (IR); Ali Reza Mortazavi, Tehran (IR); Mohammad Javad Modjtahedi, Tehran (IR); Mahmoud Reza Badamaki, Tehran (IR); Ali Mesbah, Varamin (IR); Ali Reza Khoshniyat, Tehran (IR); Mohammad Reza Kamali, Tehran (IR)

(73) Assignee: RIPI, Tehran (IR)

( * ) Notice: Subject to any disclaimer, the term of this patent is extended or adjusted under 35 U.S.C. 154(b) by 737 days.

(21) Appl. No.: 13/013,927

(22) Filed: Jan. 26, 2011

(65) Prior Publication Data

US 2012/0186812 A1    Jul. 26, 2012

(51) Int. Cl.
*C04B 14/04* (2006.01)
*B82Y 30/00* (2011.01)
*C09K 8/473* (2006.01)
*C04B 28/02* (2006.01)
*C04B 111/40* (2006.01)

(52) U.S. Cl.
CPC .............. *C09K 8/473* (2013.01); *B82Y 30/00* (2013.01); *C04B 2111/40* (2013.01); *C04B 28/02* (2013.01)
USPC .......................... 106/737; 166/292; 166/293

(58) Field of Classification Search
USPC .................... 106/737, 713; 166/292, 293
See application file for complete search history.

(56) References Cited

U.S. PATENT DOCUMENTS

| | | | | | |
|---|---|---|---|---|---|
| 2,313,107 | A | * | 3/1943 | Wertz | 106/662 |
| 3,042,537 | A | * | 7/1962 | Newell et al. | 106/788 |
| 3,661,603 | A | * | 5/1972 | Nicol | 106/672 |
| 3,902,911 | A | * | 9/1975 | Messenger | 106/676 |
| 4,009,992 | A | * | 3/1977 | Eicke | 432/106 |
| 4,036,301 | A | * | 7/1977 | Powers et al. | 166/293 |
| 4,121,945 | A | * | 10/1978 | Hurst et al. | 106/405 |
| 4,162,238 | A | * | 7/1979 | Bergna | 524/442 |
| 4,201,595 | A | * | 5/1980 | O'Neill | 106/783 |
| 4,462,836 | A | * | 7/1984 | Baker et al. | 106/720 |
| 5,121,795 | A | * | 6/1992 | Ewert et al. | 166/292 |
| 5,125,455 | A | * | 6/1992 | Harris et al. | 166/292 |
| 5,263,542 | A | * | 11/1993 | Brothers | 166/293 |
| 5,346,012 | A | * | 9/1994 | Heathman et al. | 166/293 |
| 5,932,000 | A | * | 8/1999 | Bergqvist et al. | 106/737 |
| 6,478,865 | B1 | * | 11/2002 | Malla et al. | 106/464 |
| 6,478,868 | B1 | | 11/2002 | Reddy et al. | |
| 7,388,045 | B1 | * | 6/2008 | Lewis et al. | 524/5 |
| 7,559,369 | B2 | * | 7/2009 | Roddy et al. | 166/280.2 |
| 7,631,692 | B2 | * | 12/2009 | Roddy et al. | 166/250.14 |
| 7,743,828 | B2 | * | 6/2010 | Roddy et al. | 166/277 |
| 7,784,542 | B2 | * | 8/2010 | Roddy et al. | 166/293 |
| 7,806,183 | B2 | * | 10/2010 | Roddy et al. | 166/293 |
| 7,892,352 | B2 | * | 2/2011 | Roddy et al. | 106/737 |
| 2012/0190769 | A1 | * | 7/2012 | Patil et al. | 523/130 |
| 2012/0192768 | A1 | * | 8/2012 | Ravi et al. | 106/694 |

OTHER PUBLICATIONS

DE 019506879 A1 (Aug. 22, 1996) Forkel abstract only.*

* cited by examiner

*Primary Examiner* — Paul Marcantoni
(74) *Attorney, Agent, or Firm* — Arash Behravesh

(57) ABSTRACT

Light to ultra-light cement compositions with modified rheological properties. The cement composition includes cement, hydrophobic nano-silica, at least one additive and a sufficient amount of water to make a cement slurry with high compressive strength, low porosity, low free water, and low fluid loss with a quick thickening time.

18 Claims, No Drawings

MODIFIED CEMENT COMPOSITION, PREPARATION AND APPLICATION THEREOF

FIELD OF THE INVENTION

The present teachings relate to foamed and non-foamed cement compounds and a method for preparing and applying the same.

DESCRIPTION OF THE STATE OF THE ART

Cement slurries and/or compounds are used in well structures, such as oil and gas wells. Generally, a cement slurry is pumped into an annulus between a well borehole and a well casing to make the overall well structure resistant to damages that can be caused by corrosive fluids, for example, after the cement slurry sets. The set cement slurry also secures and/or holds the well casing to the well borehole wall.

The rheological properties of a cement slurry should be such that the cement slurry keeps its homogeneity throughout the drilling and setting process. A cement slurry that can maintain its homogeneity throughout the drilling and setting process provides a cement slurry that is stable under static and dynamic conditions. One important rheological property of a cement slurry is its density. The density of a cement slurry should be such that it maintains an annular pressure of between pore pressure and fracture gradient. If the annular pressure drops below the pore pressure, formation fluids can enter the well, which can lead to a well blow out. If the annular pressure is above the fracture gradient, fluids, such as drilling fluids and/or cement slurries can leak or diffuse into the formation, which can lead to formation fracture and well damage.

Generally, the density of the cement slurry should be in a range of between 3 to 20 pounds per gallon (ppg). To maintain this density range, the cement slurry density can be adjusted by reducing or increasing the water/cement ratio. However, use of this method can compromise the quality of the cement slurry. To reduce the negative effects of adjusting the water/cement ratio, weight reducing reagents such as bentonite, MICROBLOCK (available from Elkem Oilfield Chemicals), and Perlite, hallow spheres, and/or $N_2$ gas or air have been suggested.

U.S. Pat. No. 7,559,369 (the '369 patent) describes use of hydrophilic nano-silica to prepare a cement composition having a density in the range of between 4-20 ppg. The cement composition of the '369 patent also includes nano-particles in an amount of 1-25% by weight of the cement on a dry basis (BWOC), and sufficient water (e.g., 15.36 gal/sk) to make the resulting slurry have a density of 12 ppg. According to one example, the cement slurry of the '369 patent includes a 72-hour compressive strength of 500 psi, thickening times of 2 hours and 43 minutes, and a density of 12 ppg.

Accordingly, a need exists for a light or ultra-light cement composition with modified rheological properties that include a high compressive strength, low porosity, low free water, and low fluid loss with a quick thickening time.

SUMMARY OF THE INVENTION

The present teachings provide a modified cement composition that includes cement, hydrophobic nano-silica, at least one additive and a sufficient amount of water to make a cement slurry, wherein the hydrophobic nano-silica includes a surface area of at least about 110 $m^2$/g.

The present teachings provide that the hydrophobic nano-silica includes a surface area of from about 110 $m^2$/g to about 260 $m^2$/g.

The present teachings provide that the hydrophobic nano-silica includes a surface area of from about 240 $m^2$/g to about 260 $m^2$/g.

The present teachings provide that water is present in an amount of from about 30% by weight of blend cement to about 170% by weight of blend cement.

The present teachings provide that water is present in an amount of from about 30% by weight of blend cement to about 80% by weight of blend cement.

The present teachings provide that the hydrophobic nano-silica includes a particle size of from about 1 nm to about 100 nm.

The present teachings provide that the hydrophobic nano-silica includes a particle size of from about 1 nm to about 60 nm.

The present teachings provide that the hydrophobic nano-silica includes a particle size of from about 1 nm to about 6 nm.

The present teachings provide that the hydrophobic nano-silica is present in an amount of from about 1% BWOC to about 15% BWOC.

The present teachings provide that the hydrophobic nano-silica is present in an amount of from about 1% BWOC to about 9% BWOC.

The present teachings provide that the at least one additive comprises at least one of light weight additive, an anti-foaming agent, a retardant, an accelerator, a dispersant, a fluid loss controlling agent, a surfactant, and a gas migration controlling agent.

The present teachings provide that the gas migration controlling agent includes at least one of (i) a composition having at least about 90% $SiO_2$, from about 0.5% to about 2.0% $Al_2O_3$, from about 0.2% to about 1.5% $Fe_2O_3$, from about 0.1% to about 0.5% CaO, from about 0.1% to about 1.5% $Na_2O$, from about 0.5% to about 2.0% $K_2O$, from about 0.5% to about 2.0% MgO, from about 0.1% to about 0.4% $SO_3$, and from about 0.5% to about 2.5% C and (ii) a composition having at least latex particles.

The present teachings provide that the cement, hydrophobic nano-silica, and the at least one additive include a predetermined particle size to maximize a packing volume fraction.

The present teachings provide that the cement includes a particle size of from about 10 µm to about 50 µm and the at least one additive includes a particle size of from about 51 µm to about 370 µm.

The present teachings provide that the additive is present in an amount of from about 0.1% BWOC to about 150% BWOC.

The present teachings further provide a modified cement composition with a 24-hour compressive strength of about 4450 psi.

The present teachings further provide a modified cement composition including cement, hydrophobic nano-silica, and at least one additive and water to make a cement slurry having a 24-hour compressive strength of about 4450 psi.

The present teachings provide that water is present in an amount of about 127% or less by weight of blend cement.

The present teachings further provide a modified cement composition including cement with a particle size of from about 10 µm to about 50µ., hydrophobic nano-silica with a surface area of from about 110 $m^2$/g to about 260 $m^2$/g, at least one additive with a particle size of from about 51 µm to about 370 µm, and a sufficient amount of water to make a cement slurry.

The present teachings provide a method for making a well structure that is resistant to damaging and corrosive fluids and the securement of a well casing to a well borehole wall by applying the modified cement composition of the present teachings to a predetermined location.

Additional features and advantages of various embodiments will be set forth, in part, in the description that follows, and will, in part, be apparent from the description, or may be learned by the practice of various embodiments. The objectives and other advantages of various embodiments will be realized and attained by means of the elements and combinations particularly pointed out in the description herein.

DETAILED DESCRIPTION

The present teaching is directed to an improved cement composition/slurry that has a density of from about 3.5 pounds per gallon (ppg) to about 20 ppg with high compressive strength, short thickening/curing time, as well as low porosity, permeability, free water, and static and dynamic fluid loss.

The composition of the present teachings can include cement, hydrophobic nano-silica having a surface area of at least about 110 $m^2/g$, at least one additive, and a sufficient amount of water to make a cement slurry.

The hydrophobic nano-silica particles present in the composition of the present teachings can include a size of from about 1 nm to about 100 nm. For example, the hydrophobic nano-silica particles can include a size of from about 1 nm to about 60 nm, such as from about 1 nm to about 6 nm.

As stated above, the hydrophobic nano-silica particles of the present teachings include a surface area of at least about 110 $m^2/g$. For example, the hydrophobic nano-silica particles can include a surface area of from about 110 $m^2/g$ to about 260 $m^2/g$, such as, from about 240 $m^2/g$ to about 260 $m^2/g$. The high surface area of the hydrophobic nano-silica particles decreases the density, thickening/curing time, porosity, permeability, free water and fluid loss of the cement slurry and increases the compressive strength of the cement.

In one exemplary embodiment of the present teachings, the hydrophobic nano-silica particles are present in an amount of from about 1% BWOC to about 15% BWOC. For example, the hydrophobic nano-silica particles are present in amount of from about 1% BWOC to about 9% BWOC.

The composition of the present teachings also includes water to make the cement slurry. The water in the composition of the present teachings can be fresh water or salt water (e.g., sea water). The amount of water in the cement composition of the present teachings can be from about 30% by weight of blend cement (blend cement can be defined as a composition containing cement, hydrophobic nano-silica, and at least one additive) or less to about 170% by weight of blend cement or more to make a slurry composition that can be pumped. In one example, the amount of water can be from about 30% by weight of blend cement to about 80% by weight of blend cement.

As stated above, the composition of the present teachings also includes at least one additive. The additive can be a lightening agent (e.g., microsphere), an anti-foaming agent, a retardant, an accelerator, a dispersant, a fluid loss controlling agent, a surfactant, and/or a gas migration controlling agent, to name a few.

In one exemplary embodiment of the present teachings, the additive is present in an amount of from about 0.1% BWOC to about 150% BWOC. In one example, when the additive is microspheres, the microspheres can be present in the cement composition in an amount of from about 0.1% BWOC to about 150% BWOC.

In one example, when the additive is a gas migration controlling agent, the gas migration controlling agent can include a composition having at least about 90% $SiO_2$, from about 0.5% to about 2.0% $Al_2O_3$, from about 0.2% to about 1.5% $Fe_2O_3$, from about 0.1% to about 0.5% CaO, from about 0.1% to about 1.5% $Na_2O$, from about 0.5% to about 2.0% $K_2O$, from about 0.5% to about 2.0% MgO, from about 0.1% to about 0.4% $SO_3$, and from about 0.5% to about 2.5% C. For example, the gas migration controlling agent can be MICROBLOCK, which can be purchased from Elkem Materials, P.O. Box 266, Pittsburgh, Pa. 15230-0266, Airport Office Park, Building 2, 400 Rouser Road, Moon Township, Pa. 15108-2749.

In another example, the gas migration controlling agent can include a composition having at least latex particles. An example of a latex-based gas migration controlling agent is para gas, such as Schlumberger GAS BLOCK D600, which can be purchased from Schlumberger Oilfield Services located at 1325 S. Dairy Ashford Dr., Houston, Tex. 77077.

In one exemplary embodiment of the present teachings, the cement can be foam cement. The foam cement can include one or more types of gasses including nitrogen and/or air, in addition to other ingredients.

In another exemplary embodiment of the present teachings, the cement can be hydraulic cements. Exemplary hydraulic cements include, but are not limited to, Portland, posaloani, gypsum, aluminum, and/or silicon cements. In one example, when the hydraulic cement is Portland cement, the Portland cement can be one that is classified as class A, C, D, E, J, H, or G by the American Petroleum Institute (API).

According to an exemplary embodiment, the size and the ratio of the cement, the hydrophobic nano-silica, and the at least one additive particle (the combination of which, hereinafter referred to as the "dry particles") are selected to maximize the packing volume fraction (PVF). PVF is defined as the volume occupied by the solid particles over the bulk volume of the particles when the dry particles are in maximum compactness.

In one example, to maximize the PVF, the dry particles are sized such that the dry particles are on the verge of settlement in the cement slurry. In another example, the size of the hydrophobic nano-silica particles are from about 1 nm to about 100 nm in an amount of from about 1% BWOC to about 15% BWOC and the size of the cement particles and the at least one additive are from about medium to about large and in an amount to maximize the PVF. For example, the size of the cement particles can be from about 10 μm to about 50 μm and the size of the at least one additive can be from about 51 μm to about 370 μm.

A method for preparing the composition of the present teachings includes: (a) mixing cement with the hydrophobic nano-silica particles, (b) adding at least one of the additives described above to water to make a water-additive mixture, and (c) mixing the product from step (a) with the product from step (b).

In one exemplary embodiment of the present teachings, when microspheres are used as the additive, the microspheres, the cement, and the hydrophobic nano-silica can be mixed together in one step. As one option, the microspheres can be added directly to the mixture of step (a) (i.e., the mixture of the cement and the hydrophobic nano-silica). Accordingly, there is no need to add the microspheres to water to make a water-microsphere mixture, as described in step (b), prior to adding the microspheres to the cement and the hydrophobic nano-silica mixture.

In another exemplary embodiment of the present teachings, water can be added to the mixture of the cement, the hydrophobic nano-silica particles and the additives.

Once the cement slurry of the present teachings has been prepared by one of the methods described above, the cement slurry can be applied to a desired location to cure and harden.

The cement composition of the present teachings can be used for any underground applications including primary, secondary, remedial, and oil/water/gas well reconstruction. Additionally, the cement composition of the present teachings can be used in deep and/or very deep wells and in cold places (temperatures over 20° F.). It can also be used for any surface (construction) cementing operations.

It should be recognized that the examples below are provided to aid in a general understanding of the present teachings, and the scope of the invention is not limited to the content of the examples.

Example 1

A cement slurry having a density of 6 ppg and a composition according to Table 1 was prepared.

TABLE 1

Composition of Cement Slurries with a Density of 6 ppg

| Component | Concentration |
|---|---|
| Blend Cement | 110 lb/sk |
| Sea Water | 12.12 gal/sk |
| Retarder | 1.59 lb/sk |
| Dispersant | 0.52 lb/sk |
| Antifoam | 0.02 gal/sk |

To prepare this cement slurry composition, a cement blend containing class G cement, hydrophobic nano-silica particles having a particle size of 2 nm and a surface area of 250 m$^2$/g in an amount of 9% BWOC, and a microsphere additive having a particle size of 105 μm in an amount of 110% BWOC were used.

To prepare the cement slurry, the cement, the hydrophobic nano-silica particles, and the microsphere were mixed at the desired amounts and the prepared mixture was added to a solution of water, a retarder (e.g., Schlumberger R-8), a dispersant (Halliburton CFR-2), and an anti-foaming reagent (Schlumberger D-047). To compare the effect of the hydrophobic nano-silica particles on the physicochemical properties of the slurry, two similar slurries with and without these particles were prepared. The retarder additive was used to increase the thickening time and the dispersant was used to make the slurry thinner and more dispersed.

After preparing the cement slurry, its rheological properties were studied using a fan device (viscometer) at laboratory conditions. The results are shown in Table 2. The results indicate an increase in the viscosity of the slurry containing the hydrophobic nano-silica particles, which prevented the slurry from separating into different phases.

TABLE 2

Rheological Properties of Cement Slurries with a Density of 6 ppg

| | Dial reading | |
|---|---|---|
| (RPM) | With a nano particle | Without a nano particle |
| 600 | 130 | 110 |
| 300 | 61 | 49 |
| 200 | 50 | 35 |
| 100 | 28 | 20 |
| 6 | 3 | 1.5 |
| 3 | 0.5 | 0.5 |
| AV(cP) | 65 | 55 |
| PV(cP) | 49.5 | 43.5 |
| YP(lbs/100 ft$^2$) | 11.5 | 5.5 |

A test for measuring the thickening time of the cement slurry was performed at 190° F. and at a pressure of 5000 psi and the thickening time was recorded when the slurry consistency reached 70 Bc. The test results indicated that the high surface of the hydrophobic nano-silica particles shortened the thickening time.

Tests to measure the compressive strength of the slurry were performed at 190° F. and 220° F. and under 3000 psi using a UCA device. The results indicated that the hydrophobic nano-silica particles affect the compressive strength of the cement slurry. The time required for reaching a compressive strength of 500 psi was measured to be 4 hours after which the drilling operation could be continued.

Also, tests on measuring the static fluid loss at 190° F. and at 1100 psi, free water (at ambient temperature), porosity, and permeability were performed based on the API standard. These results are shown in Table 3. The results are evidence of the applicability of the cement slurry.

TABLE 3

Specifications of Cement Slurry with a Density of 6 ppg

| WT (lb/gal) | Effective porosity (%) | Ultra permeability (md) | API Fluid Loss at 190° F. (ml/30 min) | Compressive Strength 500 Psi@ BHST (hr) | Free water at 77° F. (cc) | Thickening Time at 190° F. (min) | Compressive Strength at 190° F. 72 hours (psi) | Compressive Strength at 220° F. 72 hours (psi) |
|---|---|---|---|---|---|---|---|---|
| Cement slurry properties (With a nano particle) | | | | | | | | |
| 6 | 38 | 0.01 | 9 | 4 | 0.0 | 175 | 1900 | 2300 |
| Cement slurry properties (Without nano particle) | | | | | | | | |
| 6 | 58 | 1.6 | 500 | 19 | 20 | 480 | 250 | 330 |

Example 2

A cement slurry having a density of 8.34 ppg and a composition according to Table 4 was prepared.

TABLE 4

Composition of a Cement Slurry with a Density of 8.34 ppg

| Component | Concentration |
|---|---|
| Blend Cement | 110 lb/sk |
| Sea Water | 10.23 gal/sk |

TABLE 4-continued

Composition of a Cement Slurry with a Density of 8.34 ppg

| Component | Concentration |
|---|---|
| Retarder | 1.49 lb/sk |
| Dispersant | 0.42 lb/sk |
| Antifoam | 0.02 gal/sk |

To prepare this cement slurry composition, a cement blend containing class G cement, hydrophobic nano-silica particles having a particle size of 7 nm and a surface area of 220 m$^2$/g in an amount of 7% BWOC, and a microsphere additive having a particle size of 115 μm in an amount of 85% BWOC were used.

All tests were performed under identical conditions and used the same instrumentation as in Example 1. The results are provided in Tables 5 and 6 below.

TABLE 5

Rheological Properties of a Cement Slurry with a Density of 8.34 ppg

| (rpm) | Dial reading |
|---|---|
| 600 | 122 |
| 300 | 67 |
| 200 | 48 |
| 100 | 26 |
| 6 | 2 |
| 3 | 0.5 |
| AV(cP) | 61 |
| PV(cP) | 55 |
| YP(lbs/100 ft$^2$) | 12 |

TABLE 6

Specifications of a Cement Slurry with a Density of 8.34 ppg

Cement slurry properties

| WT (lb/gal) | Effective porosity (%) | Ultra permeability (md) | API Fluid Loss at 190° F. (ml/30 min) | Compressive Strength 500 Psi@ BHST(hr) | Free water at 77° F. (cc) | Thickening Time at 190° F. (min) | Compressive Strength at 190° F. 72 hours (psi) | Compressive Strength at 220° F. 72 hours (psi) |
|---|---|---|---|---|---|---|---|---|
| 8.34 | 36 | 0.001 | 12 | 7 | 0.0 | 180 | 2250 | 2400 |

Example 3

A cement slurry having a density of 10.16 ppg and a composition according to Table 7 was prepared.

TABLE 7

Composition of a Cement Slurry with a Density of 10.16 ppg

| Component | Concentration |
|---|---|
| Blend Cement | 110 lb/sk |
| Sea Water | 8.95 gal/sk |
| Retarder | 1.29 lb/sk |
| Dispersant | 0.12 lb/sk |
| Antifoam | 0.02 gal/sk |

To prepare this cement slurry composition, a cement blend containing class H cement, hydrophobic nano-silica particles having a particle size of 20 nm and a surface area of 180 m$^2$/g in an amount of 5% BWOC, and a microsphere additive having a particle size of 115 μm in an amount of 70% BWOC were used.

All tests were performed under identical conditions and used the same instrumentation as in Examples 1 and 2. The results are provided in Tables 8 and 9 below.

TABLE 8

Rheological Properties of a Cement Slurry with a Density of 10.16 ppg

| (rpm) | Dial reading |
|---|---|
| 600 | 244 |
| 300 | 141 |
| 200 | 104 |
| 100 | 63 |
| 6 | 19 |
| 3 | 17 |
| AV(cP) | 122 |
| PV(cP) | 117 |
| YP(lbs/100 ft$^2$) | 24 |

TABLE 9

Specifications of a Cement Slurry with a Density of 10.16 ppg

Cement slurry properties

| WT (lb/gal) | Effective porosity (%) | Ultra permeability (md) | API Fluid Loss at 190° F. (ml/30 min) | Compressive Strength 500 Psi@ BHST(hr) | Free water at 77° F. (cc) | Thickening Time at 190° F. (min) | Compressive Strength at 190° F. 72 hours (psi) | Compressive Strength at 220° F. 72 hours (psi) |
|---|---|---|---|---|---|---|---|---|
| 10.16 | 16 | 0.0001 | 22 | 5.5 | 0.0 | 190 | 2850 | 2855 |

Example 4

A cement slurry having a density of 12.03 ppg with a composition according to Table 10 was prepared.

TABLE 10

Composition of a Cement Slurry with a Density of 12.03 ppg

| Component | Concentration |
| --- | --- |
| Blend Cement | 110 lb/sk |
| Sea Water | 4.46 gal/sk |
| Retarder | 0.82 lb/sk |
| Dispersant | 1.24 lb/sk |

To prepare this cement slurry composition, a cement blend containing class H cement, hydrophobic nano-silica particles having a particle size of 10 nm and a surface area of 150 m$^2$/g in an amount of 3% BWOC, and a microsphere additive having a particle size of 115 μm in an amount of 60% BWOC were used.

All tests were performed under identical conditions and using the same instrumentation as in Examples 1 through 3. The results are provided in Tables 11 and 12 below.

TABLE 11

Rheological Properties of a Cement Slurry with a Density of 12.03 ppg

| (rpm) | Dial reading |
| --- | --- |
| 600 | 299 |
| 300 | 240 |
| 200 | 174 |
| 100 | 97 |
| 6 | 10 |
| 3 | 6 |
| AV(cP) | 149.5 |
| PV(cP) | 214.5 |
| YP(lbs/100 ft$^2$) | 25.5 |

TABLE 12

The Specifications of a Cement Slurry with a Density of 12.03 ppg

Cement slurry properties

| WT (lb/gal) | Effective porosity (%) | Ultra permeability (md) | API Fluid Loss at 190° F. (ml/30 min) | Compressive Strength 500 Psi@ BHST(hr) | Free water at 77° F. (cc) | Thickening Time at 190° F. (min) | Compressive Strength at 190° F. 72 hours (psi) | Compressive Strength at 220° F. 72 hours (psi) |
| --- | --- | --- | --- | --- | --- | --- | --- | --- |
| 12.03 | 9 | 0.0001 | 25 | 4 | 0.0 | 145 | 4600 | 4650 |

Example 5

Comparative Example

Cement slurry A having a density of 12 ppg and a composition according to Table 13 was prepared. Cement slurry A was then compared with the slurry disclosed in U.S. Pat. No. 7,559,369 with respect to the slurry quality parameters. The test results are provided in Table 14.

TABLE 13

The Specification of the Hydrophobic Nano-Silica Particles in the Cement Slurries with a Density of 12 ppg and the Amount of Water Used

| WT (lb/gal) | Quantity of water in cement (gal/sk) | Silica Type | Surface area (m$^2$/gr) |
| --- | --- | --- | --- |
| A | 12 | 4.46 | Nano Hydrophobic Silica (10 nm) | 250 |
| B | 12 | 15.36 | Particulate Nano-Silica (10 nm) | — |

To prepare cement slurry A, a cement blend containing class G cement, hydrophobic nano-silica particles having a particle size of 10 nm and a surface area of 250 m$^2$/g in an amount of 3% BWOC, and a microsphere additive having a particle size of 115 μm in an amount of 60% BWOC were used.

A cement slurry B was prepared using class G cement. The hydrophilic nano-silica and the additive (i.e., a retarder) were used in an amount of 15% BWOC and 0.5% BWOC, respectively (see U.S. Pat. No. 7,559,369).

According to the results in Table 14, the presence of hydrophobic nano-silica particles with a high surface area reduces the thickening time, porosity, permeability, fluid loss, time to reach 500 psi compressive strength, and improves the compressive strength of the cement.

TABLE 14

Comparison of Cement Slurries with a Density of 12 ppg

Cement slurry properties

| WT (lb/gal) | Free water at 77° F. (cc) | Thickening Time at 80° F. (min) | Compressive Strength at 100° F. (72 hours) psi | Compressive Strength at 155° F. (24 hours) psi |
| --- | --- | --- | --- | --- |
| A 12 | 0.0 | 110 | 4100 | 4450 |
| B 12 | — | 300 | 500 | — |

From the foregoing description, those skilled in the art can appreciate that the present teachings can be implemented in a variety of forms. Therefore, while these teachings have been described in connection with particular embodiments and examples thereof, the true scope of the present teachings should not be so limited. Various changes and modifications may be made without departing from the scope of the teachings herein.

What is claimed is:

1. A modified cement composition comprising cement, hydrophobic nano-silica, at least one additive and a sufficient amount of water to make a cement slurry, wherein the hydrophobic nano-silica includes a surface area of at least about 110 m$^2$/g, wherein the at least one additive comprises at least one of light weight additive, an anti-foaming agent, a retardant, an accelerator, a dispersant, a fluid loss controlling agent, a surfactant, and a gas migration controlling agent and wherein the cement includes a particle size of from about 10

µm to about 50 µm and the at least one additive includes a particle size of from about 51 µm to about 370 µm.

2. The modified cement composition of claim 1, wherein the hydrophobic nano-silica includes a surface area of from about 110 m²/g to about 260 m²/g.

3. The modified cement composition of claim 1, wherein the hydrophobic nano-silica includes a surface area of from about 240 m²/g to about 260 m²/g.

4. The modified cement composition of claim 1, wherein water is present in an amount of from about 30% by weight of blend cement to about 170% by weight of blend cement.

5. The modified cement composition of claim 1, wherein water is present in an amount of from about 30% by weight of blend cement to about 80% by weight of blend cement.

6. The modified cement composition of claim 1, wherein the hydrophobic nano-silica includes a particle size of from about 1 nm to about 100 nm.

7. The modified cement composition of claim 1, wherein the hydrophobic nano-silica includes a particle size of from about 1 nm to about 60 nm.

8. The modified cement composition of claim 1, wherein the hydrophobic nano-silica includes a particle size of from about 1 nm to about 6 nm.

9. The modified cement composition of claim 1, wherein the hydrophobic nano-silica is present in an amount of from about 1% BWOC to about 15% BWOC.

10. The modified cement composition of claim 1, wherein the hydrophobic nano-silica is present in an amount of from about 1% BWOC to about 9% BWOC.

11. The modified cement composition of claim wherein the gas migration controlling agent comprises at least one of (i) a composition including at least about 90% $SiO_2$, from about 0.5% to about 2.0% $Al_2O_3$, from about 0.2% to about 1.5% $Fe_2O_3$, from about 0.1% to about 0.5% CaO, from about 0.1% to about 1.5% $Na_2O$, from about 0.5% to about 2.0% $K_2O$, from about 0.5% to about 2.0% MgO, from about 0.1% to about 0.4% $SO_3$, and from about 0.5% to about 2.5% C and (ii) a composition including at least latex particles.

12. The modified cement composition of claim 1, wherein the cement, hydrophobic nano-silica, and the at least one additive include a particle size to maximize a packing volume fraction.

13. The modified cement composition of claim 1, wherein the additive is present in an amount of from about 0.1% BWOC to about 150% BWOC.

14. The modified cement composition of claim 1 comprising a 24-hour compressive strength of about 4450 psi.

15. A modified cement composition comprising cement, hydrophobic nano-silica, and at least one additive and water to make a cement slurry having a 24-hour compressive strength of about 4450 psi, wherein the at least one additive comprises at least one of light weight additive, an anti-foaming agent, a retardant, an accelerator, a dispersant, a fluid loss controlling agent, a surfactant, and a gas migration controlling agent.

16. The modified cement composition of claim 15, wherein water is present in an amount of about 127% or less by weight of blend cement.

17. A modified cement composition comprising cement with a particle size of from about 10 µm to about 50 µm, hydrophobic nano-silica with a surface area of from about 110 m²/g to about 260 m²/g, at least one additive with a particle size of from about 51 µm to about 370 µm, and a sufficient amount of water to make a cement slurry, wherein the at least one additive comprises at least one of light weight additive, an anti-foaming agent, a retardant, an accelerator, a dispersant, a fluid loss controlling agent, a surfactant, and a gas migration controlling agent.

18. A method for making a well structure resistant to damaging and corrosive fluids and securement of a well casing to a well borehole wall comprising the steps of applying the modified cement composition of claim 1 to a location.

* * * * *